United States Patent [19]

Chen

[11] Patent Number: 5,301,091
[45] Date of Patent: Apr. 5, 1994

[54] MOTOR VEHICLE NEON LAMP DEVICE

[76] Inventor: We C. Chen, No. 53, Sec. 1, Min Chuan E. Rd., Taipei, Taiwan

[21] Appl. No.: 45,749

[22] Filed: Apr. 14, 1993

[51] Int. Cl.$^5$ .............................................. B60Q 1/56
[52] U.S. Cl. ................................ 362/83.2; 362/216; 362/263; 362/267; 40/204
[58] Field of Search ................. 362/61, 80, 83.2, 216, 362/221, 263, 265, 267, 806, 812; 40/200, 204

[56] References Cited

U.S. PATENT DOCUMENTS

| | | | |
|---|---|---|---|
| D. 163,328 | 5/1951 | Rothman | 40/204 |
| 2,562,740 | 7/1951 | Rizer | 362/61 |
| 2,596,810 | 5/1952 | Burkhart | 362/216 |
| 2,618,089 | 11/1952 | Rose | 362/806 |
| 4,357,650 | 11/1982 | Kano | 362/80 |
| 5,150,961 | 9/1992 | Gonzalez | 362/83.2 |
| 5,156,455 | 10/1992 | Kuo | 362/83.2 |

FOREIGN PATENT DOCUMENTS 2610579 8/1988 France .............................. 362/61

*Primary Examiner*—Richard R. Cole
*Assistant Examiner*—Y. Quach
*Attorney, Agent, or Firm*—Lowe, Price, LeBlanc & Becker

[57] ABSTRACT

A motor vehicle neon lamp device for illuminating the number plate of a motor vehicle, including a transparent plastic lamp shade sealed by a rubber packing to hold a neon tube on the inside and a power transformer on the outside in a flush manner. The lamp shade has input and output electrodes fastened inside a transformer chamber thereof and respectively connected to the battery power supply of the motor vehicle and the neon tube, which are electrically connected as the power transformer is inserted in the transformer chamber on the lamp shade.

3 Claims, 4 Drawing Sheets

MOTOR VEHICLE NEON LAMP DEVICE

BACKGROUND OF THE INVENTION

The present invention relates to a motor vehicle neon lamp device for lighting up the license plate of a motor vehicle.

Various motor vehicle neon lamp devices are known, and used for illuminating the number plate of a variety of motor vehicles. These neon lamp devices commonly use a power transformer to connect the battery power supply of the motor vehicle to the neon tube. In some motor vehicle neon lamp devices, the power transformer is exposed to the outside. Because the power transformer is exposed to the outside, a part of the high tension circuit is also exposed to the air. This arrangement may cause an electric leakage easily, more particularly during raining days. Therefore, this structure of motor vehicle neon lamp device is not safe in use. There are some other motor vehicle neon lamp devices which block up the power transformer inside the lamp shade. If the power transformer is damaged, the motor vehicle neon lamp device becomes useless and should be thrown away. Therefore, this structure of motor vehicle neon lamp device is not cost-effective.

SUMMARY OF THE INVENTION

The present invention eliminates the aforesaid drawbacks. According to the preferred embodiment of the present invention, the motor vehicle neon lamp device is comprised of a mounting frame fastened to a motor vehicle surrounding the number plate, a transparent plastic lamp shade covered on the mounting frame and sealed by a rubber packing to hold a neon tube on the inside and a power transformer on the outside in a flush manner. The lamp shade has input and output electrodes fastened inside a transformer chamber thereof and respectively connected to the battery power supply of the motor vehicle and the neon tube. The output electrodes are connected to the two opposite electrodes of the neon tube by high-tension cables which are completely concealed within the lamp shade. The input electrodes and the output electrodes are electrically connected as the power transformer is inserted in the transformer chamber on the lamp shade.

DETAILED DESCRIPTION OF THE PREFERRED EMBODIMENT

Figure 1:
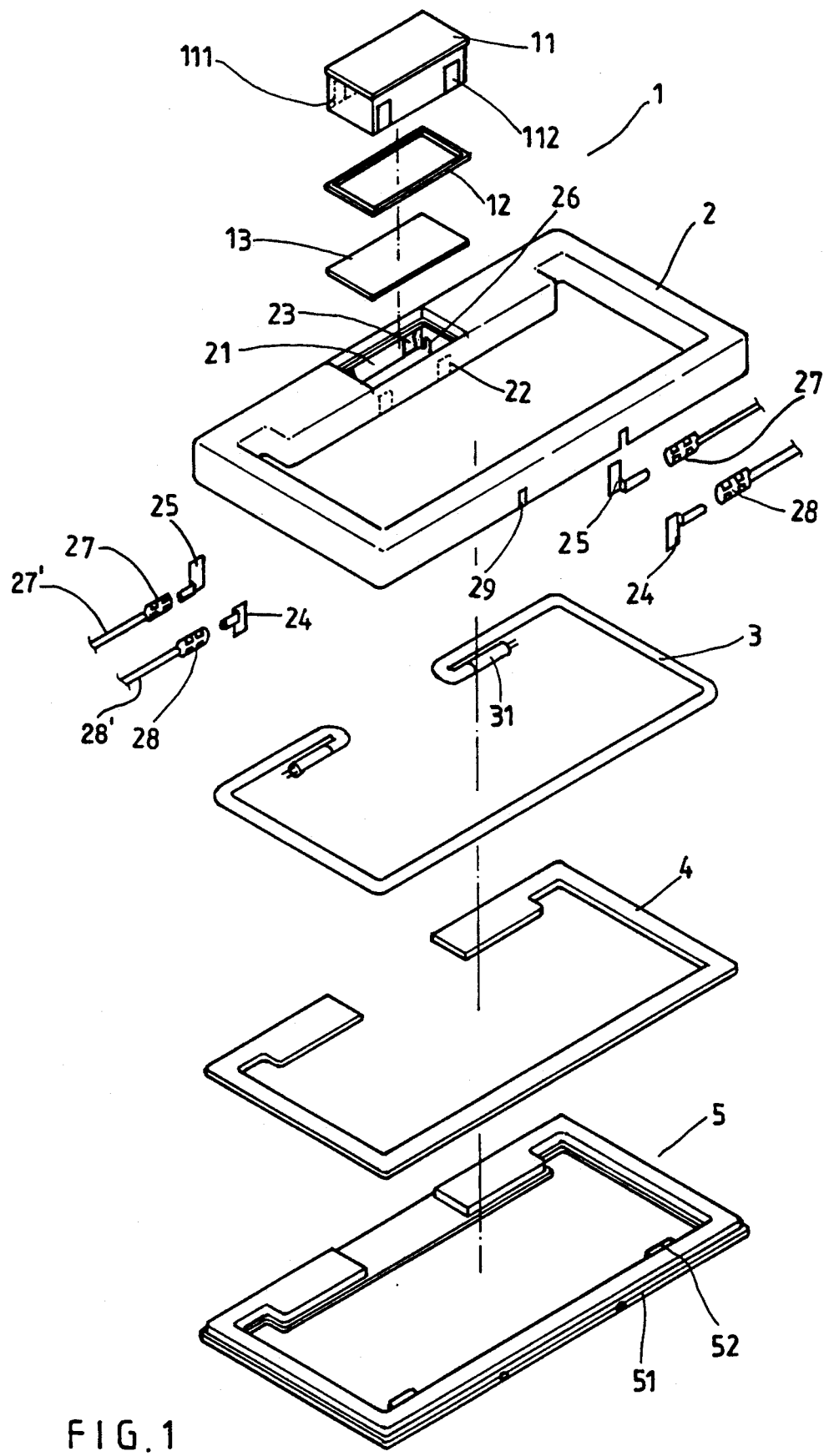
FIG. 1 is an exploded view of a motor vehicle neon lamp device constructed according to the present invention.
Figure 2:
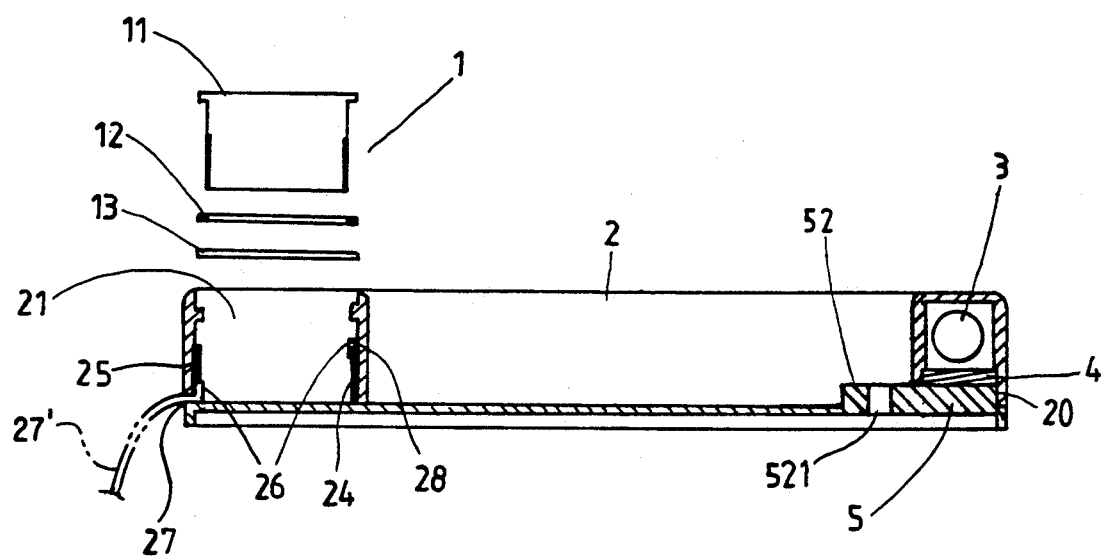
FIG. 2 is a cross sectional view of the motor vehicle neon lamp device.
Figure 3:
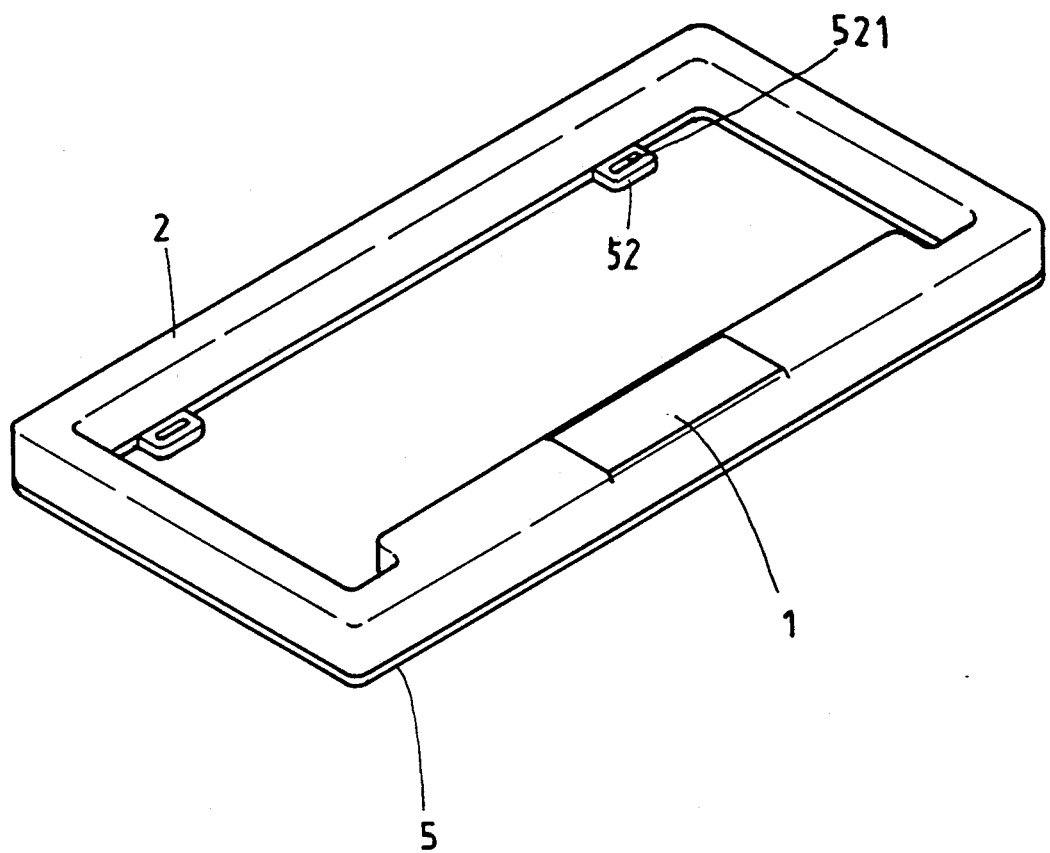
FIG. 3 is a perspective view of the motor vehicle neon lamp device.
Figure 4:
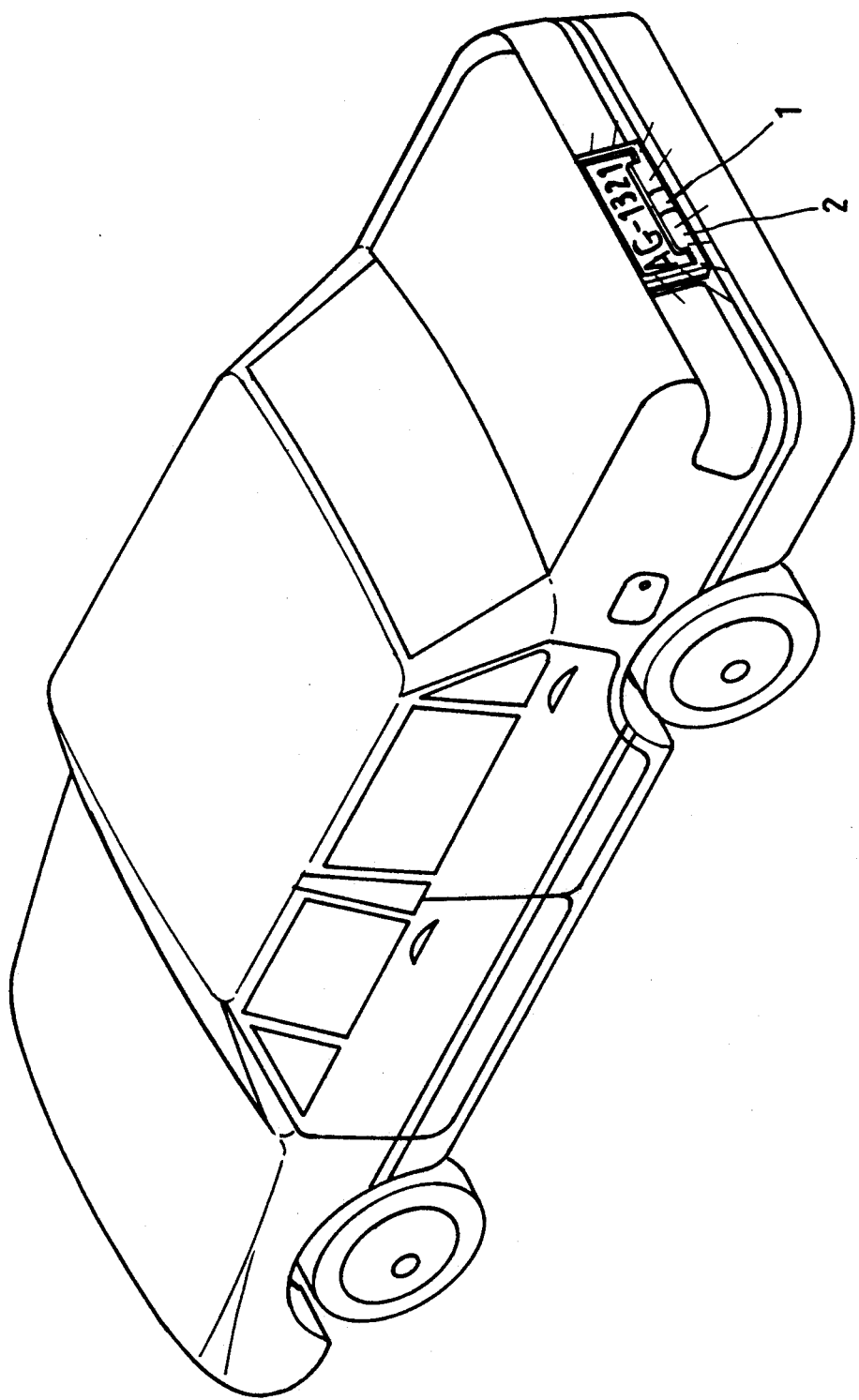
FIG. 4 is an installed view showing the motor vehicle neon lamp device mounted on the tail of an automobile to illuminate the license plate.

Referring to FIGS. 1, 2 and 3, a motor vehicle neon lamp device in accordance with the present invention is generally comprised of a power transformer 1, a transparent plastic covered lamp shade 2, a neon tube 3, a rubber packing strip 4, and a mounting frame 5. The transparent plastic covered lamp shade 2 is covered on the mounting frame 5 and sealed by the rubber packing strip 4 to hold the neon tube 3 on the inside and the power transformer 1 on the outside. The transparent plastic covered lamp shade 2 and the mounting frame 5 are made in a substantially hollow, rectangular shape surrounding the number plate to be illuminated.

Referring to FIGS. 1, 2 and 3 again, the power transformer 1 comprises a plastic housing 11 having input contacts 111 connected to power supply and output contacts 112 connected to the neon tube 3. The power transformer 1 is fastened in a transformer chamber 21 on the transparent plastic covered lamp shade 2 and sealed by a rubber sheeting 13 at the bottom and a rubber ring 12 at the top. The transparent plastic covered lamp shade 2 comprises two opposite pairs of recessed holes on two opposite sides of the transformer chamber 21 thereof, namely, the first pair of recessed holes 22, which receive output electrodes 24, and the second pair of recessed holes 23, which receive input electrodes 25, and through holes 26, through which the electrodes 24;25 are respectively extended out of the transformer chamber 21 and connected to input terminals 27 and output terminals 28 respectively. The output terminals 28 are respectively connected to the two opposite electrodes 31 of the neon tube 3 by high tension cables 28' concealed within the transparent plastic covered lamp shade. The input terminals 27 include electric wires 27' which are respectively extended out of the transparent plastic lamp shade 2 through holes 29 thereon, and connected to the two opposite terminals of the motor vehicle battery power supply. The neon tube 3 is fastened inside the transparent plastic covered lamp shade 2 having two electrodes 31 on two opposite ends thereof respectively connected to the output terminals 28. The rubber packing strip 4 is fastened in the transparent plastic covered lamp shade 2 to seal the neon tube 3 on the inside, having two opposite ends enlarged for positioning. The mounting frame 5 fits into the transparent plastic covered lamp shade 2 against peripheral flange 51 and inward mounting tabs 52 with screws (not shown) in holes 521 for installation.

Because the power transformer 1 is fastened in the transformer chamber 21 on the transparent plastic lamp shade 2 on the outside and sealed by the rubber sheeting 13 and the rubber ring 12, it can be dismantled conveniently for a repair work or replacement.

What is claimed is:

1. Motor vehicle neon lamp device comprising a mounting frame fastened to a motor vehicle surrounding a license plate, a transparent plastic covered lamp shade covered on said mounting frame comprising an inner chamber, a neon tube disposed inside said inner chamber and a power transformer disposed outside said inner chamber, wherein:

said transparent plastic covered lamp shade further comprises a recessed chamber, which receives power transformer, said recessed chamber defined by four side walls, and said power transformer being fastened in said recessed chamber with a rubber sheeting disposed between said power transformer and said frame and a rubber ring disposed between said power transformer and said side walls to seal said power transformer against dust and water;

said power transformer comprises two input contacts and two output contacts, said input contacts connected to two input electrodes detachably connecting the positive and negative input terminals to a battery power supply of the motor vehicle and said output contacts connected to two output electrodes detachably connecting the positive and negative output terminals to said neon tube;

said mounting frame comprises an outward peripheral flange fastened to, said transparent plastic covered lamp shade in a flush manner, and a plurality of mounting tabs fastened to the motor vehicle by screws.

2. The motor vehicle neon lamp device of claim 1 wherein two of said side walls comprise two opposite pairs of recessed holes to which the input and output electrodes are respectively fastened.

3. The motor vehicle neon lamp device of claim 2 wherein said transparent plastic covered lamp shade further comprises a plurality of holes, said input terminals include electric wires which are respectively extended out of said transparent plastic covered lamp shade through respective holes and connected to the battery power supply of the motor vehicle; said output terminals include high tension cables which are respectively extended from said recessed chamber and connected to the two opposite terminals of said neon tube, and said high-tension cables concealed within said transparent plastic covered lamp shade.

* * * * *